United States Patent

[11] 3,588,323

[72] Inventor Gerhard Krause
Darmstadt, Germany
[21] Appl. No. 766,406
[22] Filed Oct. 10, 1968
[45] Patented June 28, 1971
[73] Assignee Fernseh GmbH
Darmstadt, Germany
[32] Priority Oct. 12, 1967
[33] Germany
[31] P 15 37 123.0

[54] SYSTEM FOR SYNCHRONIZING THE PHASE OF COLOR SYNCHRONIZATION SIGNALS IN THE RECEIVER TO THE PHASE OF THE COLOR SUBCARRIER IN THE RECEIVED SIGNAL IN A PAL RECEIVER

7 Claims, 4 Drawing Figs.

[52] U.S. Cl. ........ 178/5.4
[51] Int. Cl. ........ H04n 5/42
[50] Field of Search ........ 178/5.4 (P), 5.4

[56] References Cited
OTHER REFERENCES
COLOR TELEVISION with particular reference to the PAL SYSTEM pp. 146— 153 Norman Price Ltd. 1967

*Primary Examiner*—Richard Murray
*Assistant Examiner*—Donald E. Stout
*Attorney*—Michael S. Striker ABSTRACT: A received color television signal has a single color subcarrier and a color synchronization signal (burst) whose phase alternates between plus and minus 45° for sequential lines. Switching signals for synchronizing the phase of said color subcarrier in the receiver to the phase of said color synchronization signal are supplied by frequency dividing circuit which receives a single line synchronization signal for each line and furnishes signals of half-line frequency. Phase selector signals for selecting the phase of the frequency dividing circuit are generated by first separating the bursts and serve to identify the color subcarrier phase from the received television signal. The bursts are then delayed for a time corresponding to a line interval and phase shifted by 90°. The phase shifted bursts are compared to the bursts without delay in a phase comparator the output signals of which have a polarity corresponding to the product of the polarities of the input signals. After filtering, signals of one polarity are selected to constitute the signals determining the phase of the frequency dividing circuit.

Inventor:
Gerhard Krause by Michael S. Striker
Attorney

Inventor:
Gerhard Krause
by Michael S. Striker
Attorney

SYSTEM FOR SYNCHRONIZING THE PHASE OF COLOR SYNCHRONIZATION SIGNALS IN THE RECEIVER TO THE PHASE OF THE COLOR SUBCARRIER IN THE RECEIVED SIGNAL IN A PAL RECEIVER

BACKGROUND OF THE INVENTION

In a color television transmission system, a single color subcarrier is simultaneously modulated in quadrature by two color difference signals. At the encoder, the phase of the color subcarrier is alternated from line to line to reduce the effect of phase errors which occur on the transmission path. On method of synchronizing the reversing switch in the receiver to the encoder switching sense is by alternating the phase position of the burst which has to be transmitted in any case to control the receiver reference carrier in every other line, and using these bursts in the receiver to furnish switching signals to switch the phase of the color synchronization signal.

A known method of accomplishing the above-discussed synchronization is to synchronize an oscillator to the median value of the alternating phase angle of the color synchronization signal and to measure the phase of the burst relative to said median phase angle. The measurement may be carried out by means of a synchronous demodulator. However, any error in the phase angle of the burst will result in an error in the signal furnished by the synchronous demodulator. Thus this method is not appropriate when interruptions occur in the color television signal as for example when the signal is derived from a magnetic storage. Furthermore the amount of equipment required is relatively high since a separate oscillator synchronized to the burst is required. Furthermore the warmup time of such an oscillator is a drawback when the television system is used in connection with magnetic storage means.

SUMMARY OF THE INVENTION

This invention comprises a system for generating switching signals for synchronizing the phase of the color synchronization signal to the phase of a color subcarrier. The system is for use in a color television receiver having color and line synchronization signals, said receiver being adapted to receiver a television signal having a single color subcarrier of subcarrier frequency modulated in quadrature by two color difference signals. The color subcarrier phase alternates from line to line, the phase in each line being identified by the corresponding phase in a burst transmitted in each line interval. The system comprises frequency dividing means for receiving for each line a single line synchronization signal and furnishing signals of half-line frequency, said signals constituting said switching signals, said frequency dividing means further having a phase selector input. The system further comprises means responsive to said phase angles in said bursts for furnishing phase selector signals for said phase selector input.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 4:
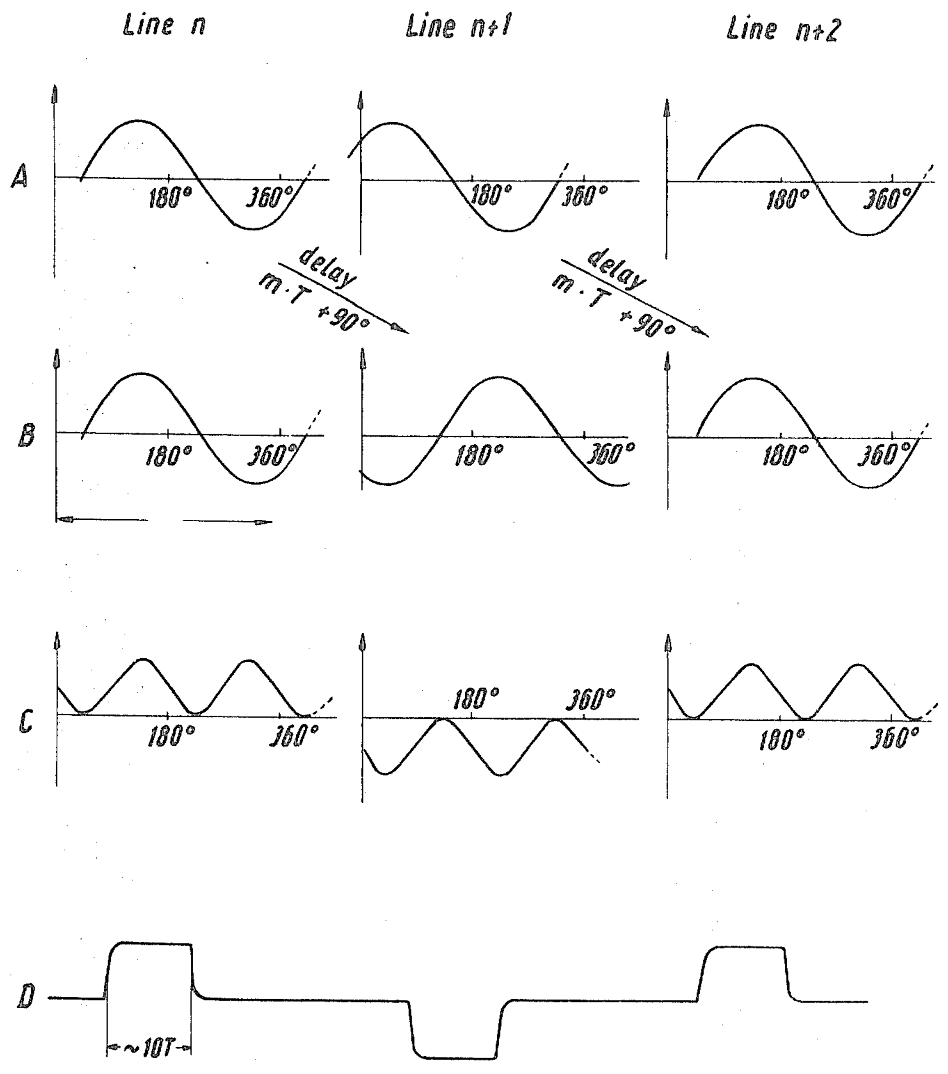
FIG. 4 is a timing diagram showing the signals at the phase comparator inputs and the phase comparator output.

The preferred embodiment of this invention will now be discussed with reference to the FIGS. In FIG. 1, the color television signal denoted by letters FBAS is received at the receiver and contains bursts whose phase angle alternates from line to line (swinging bursts). The bursts are separated from the received television signal by means of gating means, denoted gate 1 in FIG. 1. This separation is accomplished by a synchronous opening of the gate by pulses furnished either by a pulse generator operating in synchronism with the received television signal, or by pulses derived from the signal itself. If necessary, the amplitudes of the bursts may be limited in limiter means, designated 2 in FIG. 2. Delay means designated by reference number 3 in FIG. 1 serve to delay the bursts by a time equal to line interval. A line interval here is taken in the standard sense of the complete time from one line synchronization pulse to the next line syncronization pulse. The delay means 3 further cause a phase shift to occur of about 90° of the subcarrier frequency. This frequency is also the frequency contained in the burst. The delayed and phase shifted burst, hereinafter called phase shifted burst, are fed to the second input of phase comparator means denoted by reference numeral 4 in FIG. 1. The first input of the phase comparator means receives the bursts directly, that is without delay and phase shift. The first input of the phase comparator means 4 is labeled A, the second input B, and the output C. The signals at the first and second inputs and the of the phase comparator means are shown in FIG. 4. FIG. 4 shows the signals for three consecutive line intervals. It will be seen that the phase at the first input, labeled A, is plus 45° for line $n$, minus 45° for $n$+1, and again plus 45°0 for line, $n$+2. The signal at point B, or the phase shifted bursts, for line $n$+1 thus is at an angle of plus 45° plus 90° or plus 135°. The signal at point B for line $n$+2 corresponds to the signal at point A for line $n$+1 and thus has a phase angle equal to minus 45° plus 90° or plus 45°. Since the phase comparator output signal corresponds to a multiplicative superposition of the two input signals, the phase comparator output signals are shown on line C of FIG. 4. It will be seen that when the signal at input 1 is positive and the signal at input B is negative, the phase comparator output signal is a negative oscillation. When, however, the signals at points A and B are of the same polarity as for example in line $n$+2, then the phase comparator output signal is an oscillation of positive polarity. Thus the polarity of the phase comparator output signal varies from line to line and thus can serve as an indication of the phase angle of the burst. The phase comparator output signal shown in line C of FIG. 4 and appearing at point C in FIG. 1 may then be filtered by low-pass filter means whose output is shown in line D of FIG. 4. It should be noted that the time scale of line D is not the same as that of lines A, B and C. While lines A, B and C have a time scale corresponding to phase angles of the color subcarrier, the duration of the pulses shown at D correspond to 10 times the period of the color subcarrier and are labeled 10T accordingly. The pulse sequence shown on line D of FIG. 4 thus constitutes one embodiment of filtered phase comparator output signals. Selector means, in this embodiment a pulse selector labeled 6, may then serve to select pulses of, for example, positive polarity only for synchronizing the phase of the multivibrator 7, whose operation will be explained below. The signal generated by pulse selector 6 constitute phase selector signals. Pulse selector 6 may also contain threshold means for preventing the furnishing of phase selector signals when the filtered phase comparator output signals are below a predetermined amplitude.

The operation of multivibrator 7 of FIG. 1 will now be discussed. It is seen that the input signals to this multivibrator are signals of line frequency. The multivibrator serves as a frequency dividing means. Its output signals which are the switching signals for switching the phase of the color synchronization signal as discussed above, are of half horizontal line frequency. The phase of the multivibrator output signals, or the switching signals, is determined by the phase selector signals furnished by the selector means designated 6 in FIG. 1. It will be noted that these phase selector signals serve a function only when the phase of the multivibrator incorrect. Once the phase of the multivibrator is correct, the signals remain ineffective. Thus the generation of the phase selector signals is important only when the synchronous reception of the color television signal is interrupted, or when the circuit is first started.

Figure 1:
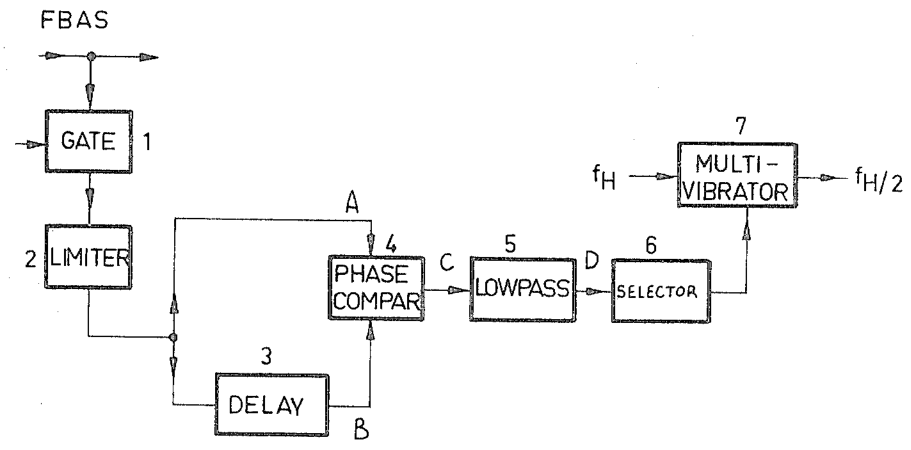
FIG. 1 is a block diagram of the system in accordance with the present invention.

Some special comments must still be made about these delay means denoted by reference numeral 3 in FIG. 1. As mentioned above, these delay means serve first to delay the burst by a time period substantially equal to a line interval. It should be noted that this correspondence to a line interval need not be completely exact, but may vary by for example several color subcarrier frequency periods. However an exact phase shift of 90° must follow this first delay. These delay lines are therefore manufactured in general by first making the delay somewhat smaller than one line interval and then fine tuning the delay time by additional delay means in such a manner that the output signals derived from the phase comparator 4 be come a maximum. This maximum may of course occur for delays of minus 90° as well as for delays of plus 90°. If the incorrect delay is obtained the phase comparator output signals or one of the input signals must be reversed in polarity.

It will be seen that the above-described system has a warmup time of only two line intervals. In spite of this, its immunity to noise is great, since only the burst is stored in delay means 3 and these delay means therefore have no signal during the remainder of the line interval. For example, if a stray pulse is generated by gating of gate 1 at an incorrect time no output signal from the phase comparator will result since only one of the two signals is furnished at the inputs of the phase comparator means. Thus the generation of switching signals of half-line frequency by multivibrator 7 is not interrupted, since the switching pulses are derived by a frequency division of a pulse sequence furnished continuously at line frequency.

Further noise immunity is obtained by the threshold means in selector 6 as mentioned above.

Figure 2:
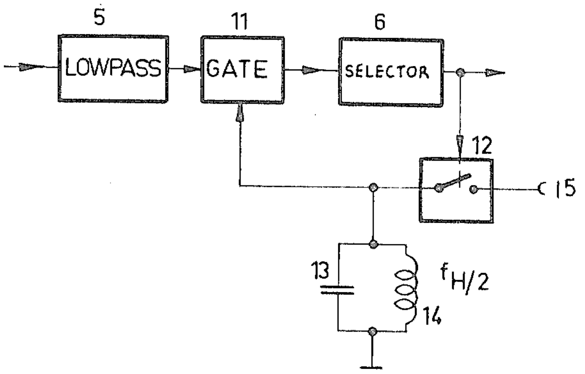
FIG. 2 shows additional error reducing means and their interconnection with the circuit of FIG. 1.
Figure 3:
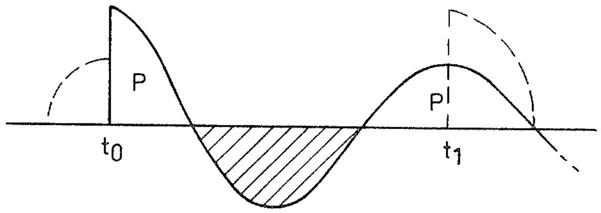
FIG. 3 shows a timing diagram for the circuit of FIG. 2.

A further method of increasing the immunity to stray signals is shown in FIG. 2. Error reducing means comprising additional gating means 11, switching means 12 and tuned circuit means comprising capacitor 13 and coil 14 are shown in this FIG., together with the interconnection with the circuit of FIG. 1. Thus the additional gating means, namely gate 11, is inserted between the low pass filter means 5 and the selector 6. The phase selector signals serve to close switching means 12 which connect the tuned circuit means to a source of charging voltage denoted by 15. Thus upon occurrence of a phase selector signal, the capacitor 13 is substantially instantaneously charged via switching means 12 from the source of charging voltage 15. Switching means 12 is again opened when the phase selector signal or pulse has died down, but the tuned circuit, tuned to one-half line frequency, furnishes oscillations as shown in FIG. 3. These oscillations are applied to gate 11 and serve to render this gate nonconductive when they are negative. The part of the oscillation for which gate 11 is nonconductive is indicated by the diagonal line in the oscillation shown in FIG. 3. Thus a phase selector pulse occurring at time $t_0$ charges the capacitor as shown in FIG. 3. Gate 11 remains conductive during the time marked $p$ in FIG. 3 and becomes nonconductive during the time indicated by the shaded lines. A time $t_1$ the capacitor may be recharged as shown in the FIG. However even if this recharging does not occur, the circuit will continue to oscillate for a time corresponding for example to five or six line intervals. The gate will thus remain nonconductive during the appropriate times during the subsequent line intervals when phase selector signals are missing. Signals occuring at the output of low-pass filter means 5 will not be effective if they occur during the negative oscillation applied to the gate. This results in increased immunity to stray signals.

While the invention has been illustrated and described as embodied in particular types of circuits, it is not intended to be limited to the details shown, since various modifications and circuit changes may be made without departing in any way from the spirit of the present invention.

What is claimed as new and desired to be protected by Letters Patent is set forth in the appended claims.

I claim:

1. In a color television system having line synchronization signals, a color subcarrier with line sequential phase alternation, and a swinging burst, in combination, frequency dividing means receiving for each line a single line synchronization signal and furnishing signals of half-line frequency, and having a phase selector input; delay means furnishing a delay time substantially equal to the time between consecutive bursts, said delay time further being equal to an integral multiple of color subcarrier periods plus a predetermined phase angle, said delay means furnishing delayed bursts at a delay output; phase comparator means having a first input receiving said bursts, a second input receiving said delayed bursts, and a phase comparator output furnishing phase comparator output signals having a polarity dependent upon the phase relationship between said bursts and said delayed bursts; selector means connected to said phase comparator output for furnishing phase comparator signals of a determined polarity only; and means connecting the output of said selector means with said phase selector input of said frequency dividing means, whereby said pulses of half-line frequency are phase synchronized with said swinging bursts.

2. A system as set forth in claim 1 in which said predetermined phase angle is substantially equal to a quarter of the color carrier period.

3. A system as set forth in claim 1 further comprising low-pass filter means for filtering said phase comparator output signals, thus furnishing filtered phase comparator output signals.

4. A system as set forth in claim 1 further comprising limiter means for limiting the amplitude of said bursts prior to said phase comparison.

5. A system as set forth in claim 1 wherein said selector means also comprises threshold means for preventing the furnishing of said phase selector signals in response to filtered phase comparator output signals below a predetermined amplitude.

6. A system as set forth in claim 1 further comprising error reducing means for preventing the furnishing of phase selector signals in the presence of errors in the timing of successive line synchronization signals.

7. A system as set forth in claim 6 wherein said error reducing means comprise tuned circuit means, tuned to one-half line frequency, said tuned circuit means including a capacitor; a source of charging voltage; switching means responsive to said phase selector signal for connecting said capacitor to said source of charging voltage in the presence of said phase selector signal thus causing said tuned circuit means to generate oscillation signals; and additional gating means connected between said low-pass filter means and said selector means and adapted to permit said filtered phase comparator output signals to pass to said selector means only during the time said oscillator signals have a predetermined polarity.